(12) United States Patent
Welker et al.

(10) Patent No.: US 7,892,460 B1
(45) Date of Patent: Feb. 22, 2011

(54) ENCLOSED DRAWING METHOD

(75) Inventors: David J. Welker, Vancouver, WA (US); Yordan Miladinov, Porland, OR (US)

(73) Assignee: Paradigm Optics, Vancouver, WA (US)

( * ) Notice: Subject to any disclaimer, the term of this patent is extended or adjusted under 35 U.S.C. 154(b) by 0 days.

(21) Appl. No.: 12/372,603

(22) Filed: Feb. 17, 2009

(51) Int. Cl.
*G02B 6/02* (2006.01)
*C03B 37/00* (2006.01)

(52) U.S. Cl. ............... 264/1.29; 264/164; 264/288.4; 264/291; 264/323; 65/385

(58) Field of Classification Search ............ 264/1.29, 264/288.4, 291, 323, 164; 65/385
See application file for complete search history.

(56) References Cited

U.S. PATENT DOCUMENTS

| | | | | |
|---|---|---|---|---|
| 3,659,980 | A * | 5/1972 | Fernandez | 425/72.2 |
| 4,309,201 | A * | 1/1982 | Klop et al. | 65/424 |
| 4,988,374 | A * | 1/1991 | Harding et al. | 65/435 |
| 5,110,526 | A * | 5/1992 | Hayashi et al. | 264/127 |
| 5,182,790 | A * | 1/1993 | Kayashima et al. | 385/141 |
| 5,204,045 | A * | 4/1993 | Courval et al. | 264/323 |
| 5,445,515 | A * | 8/1995 | Orimoto et al. | 425/526 |
| 5,637,130 | A * | 6/1997 | Nagayama et al. | 65/435 |
| 5,874,032 | A * | 2/1999 | Zdrahala et al. | 264/127 |
| 6,042,755 | A * | 3/2000 | Matsumoto | 264/1.24 |
| 6,071,441 | A * | 6/2000 | Koganezawa et al. | 264/1.24 |
| 6,365,072 | B1 * | 4/2002 | Katoot et al. | 264/1.24 |
| 6,537,377 | B1 * | 3/2003 | Piffaretti | 118/420 |
| 6,706,221 | B1 * | 3/2004 | Kikuchi et al. | 264/1.24 |
| 2002/0092328 | A1 * | 7/2002 | Pedrido et al. | 65/540 |
| 2004/0041305 | A1 * | 3/2004 | Tsuura et al. | 264/335 |
| 2005/0066690 | A1 * | 3/2005 | Yamashita et al. | 65/382 |
| 2005/0144988 | A1 * | 7/2005 | Yoon et al. | 65/507 |
| 2005/0167875 | A1 * | 8/2005 | Hayashi et al. | 264/127 |
| 2005/0189661 | A1 * | 9/2005 | Blaney et al. | 261/76 |
| 2005/0213906 | A1 * | 9/2005 | Ogura et al. | 385/123 |
| 2005/0257571 | A1 * | 11/2005 | Koaizawa et al. | 65/397 |
| 2006/0228082 | A1 * | 10/2006 | Kamada | 385/124 |

(Continued)

FOREIGN PATENT DOCUMENTS

JP 08-337431 * 12/1996

(Continued)

OTHER PUBLICATIONS

Reeve et al., "Investigation of Convective Heating in a Polymer Fiber Drawing Process," *Polymer Composites* 24:279-290 (2003).

(Continued)

*Primary Examiner*—Joseph S Del Sole
*Assistant Examiner*—Nahida Sultana
(74) *Attorney, Agent, or Firm*—Kilpatrick, Townsend & Stockton LLP

(57) ABSTRACT

A system and method for drawing a preform. A draw tower includes a mount configured to suspend a preform. The method includes securing the preform to a mount and enclosing the preform in an enclosure. The enclosure has an external surface and defines an orifice through which material drawn from the preform can exit the enclosure. The preform is heated through the external surface is heated to a temperature suitable for drawing the material from the preform. Material is drawn from the preform through the orifice and collected.

24 Claims, 3 Drawing Sheets

U.S. PATENT DOCUMENTS

| | | |
|---|---|---|
| 2006/0280578 A1* | 12/2006 | Shiono .................. 411/542 |
| 2007/0022787 A1* | 2/2007 | Gupta et al. .................. 65/416 |
| 2007/0028651 A1* | 2/2007 | Dowd et al. .................. 65/393 |
| 2007/0113589 A1* | 5/2007 | Paganessi .................. 65/434 |
| 2007/0283722 A1* | 12/2007 | Pathak et al. .................. 65/500 |
| 2008/0107385 A1* | 5/2008 | Ohga et al. .................. 385/123 |
| 2008/0277810 A1* | 11/2008 | Sato et al. .................. 264/1.29 |
| 2008/0290547 A1* | 11/2008 | Kashikar et al. .................. 264/1.24 |
| 2009/0017217 A1* | 1/2009 | Hass et al. .................. 427/446 |
| 2009/0260848 A1* | 10/2009 | Perera et al. .......... 174/110 SR |
| 2010/0122558 A1* | 5/2010 | Jewell et al. .................. 65/427 |

FOREIGN PATENT DOCUMENTS

WO    WO 2006/126691 A1 * 11/2006

OTHER PUBLICATIONS

Reeve and Mescher, "Effect of unsteady natural convection on the diameter of drawn polymer optical fiber," *Optics Express* 11:1770-1779 (2003).

* cited by examiner

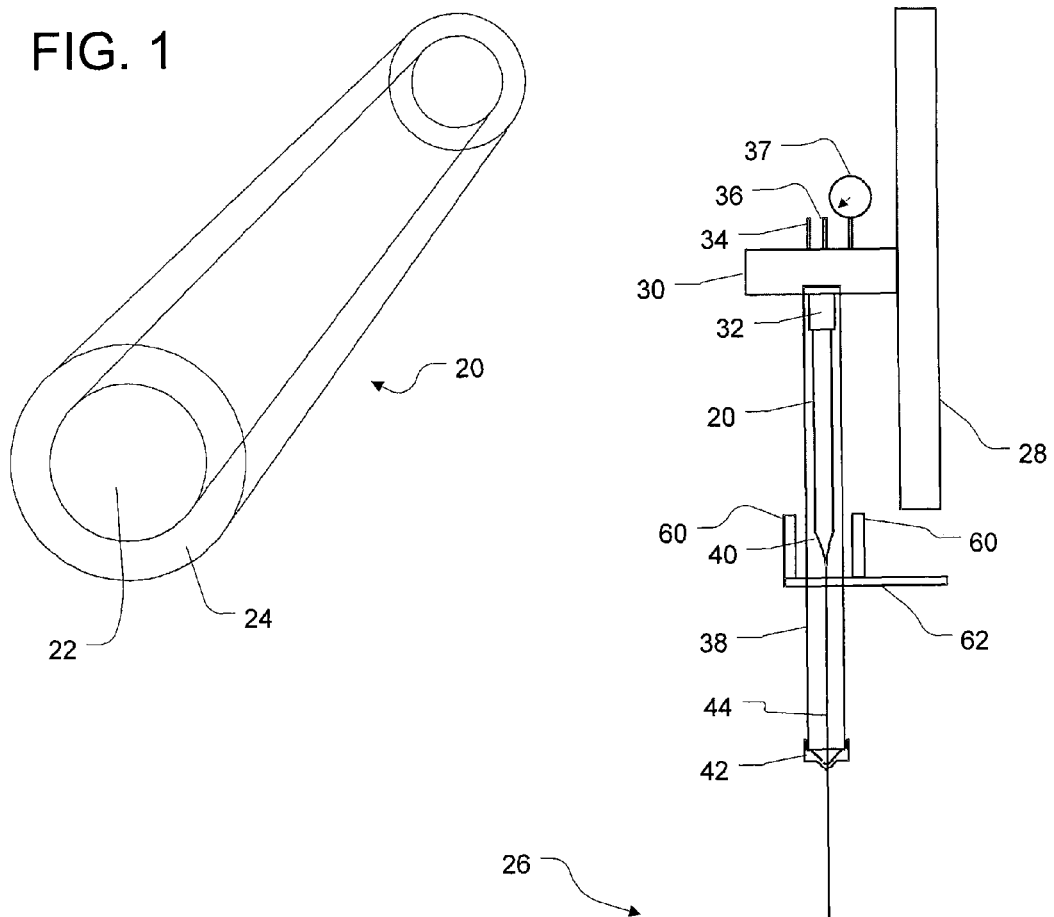
FIG. 1
FIG. 2
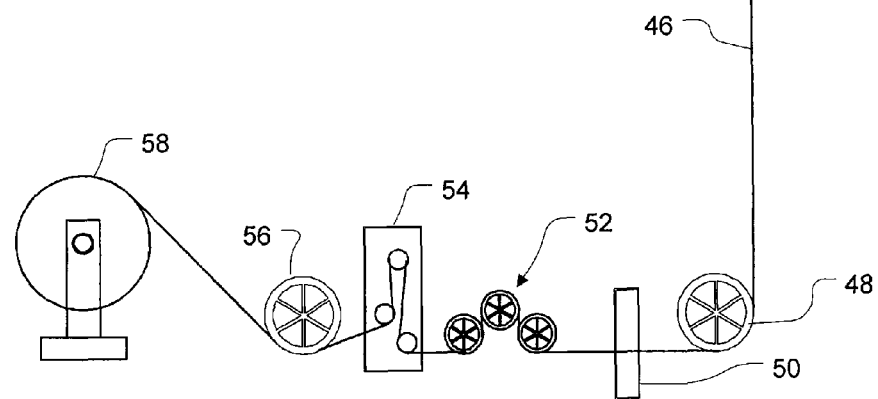

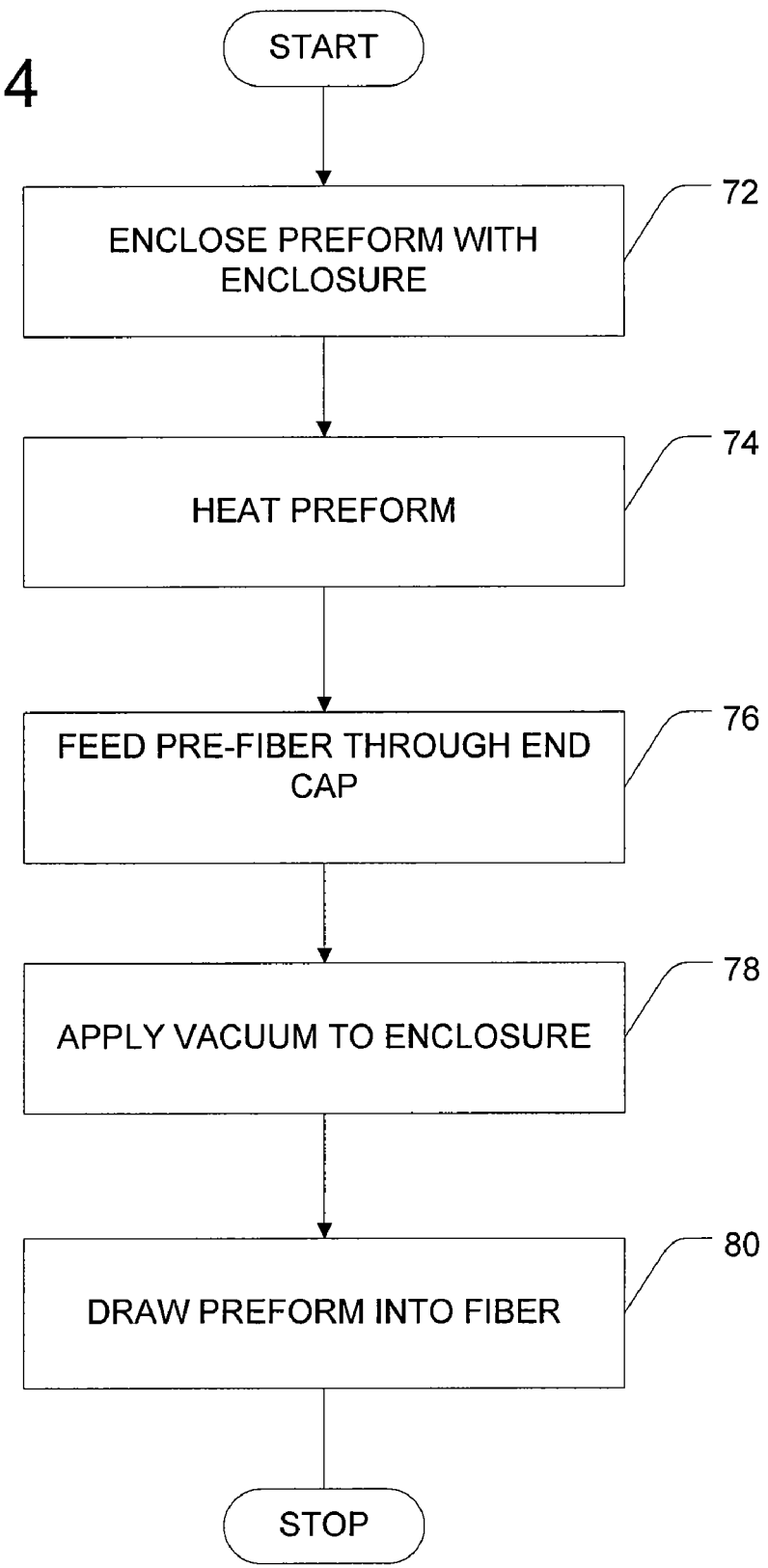

ENCLOSED DRAWING METHOD

BACKGROUND

Most fiber structures are manufactured through extrusion processes where fibers are extruded from a die. For some types of fiber structures it is beneficial to use a drawing process, where a fiber preform is drawn into a fiber. Preform drawing can be used to produce fiber-like structures such as Polymer Optical Fibers (POFs), Micro-structured fibers, photonic crystal fibers, and Capillary Fibers.

One significant problem when drawing fibers from a preform is that diameter fluctuations can be caused by chaotic thermal air currents in the neck-down region of a preform. Indeed, thermal air currents can cause diameter variations of plus or minus 10% or more. Hayden Reeve, Ann Mescher, and Ashley Emery of the University of Washington (UW) Seattle have published papers concerning this problem. According to Hayden Reeve and Ann Mescher "the contribution of natural convection in glass optical fiber drawing has generally been neglected, natural convection accounts for approximately 30% of the heating during POF drawing in the absence of forced convection. Hayden M. Reeve & Ann M. Mescher, *Effect of Unsteady Natural Convection on the Diameter of Drawn Polymer Optical Fiber*, OPTICS EXPRESS 11-15, 1771 (2003). Furthermore, "unsteady natural convection during POF drawing can cause large (±15 μm) variations in the fiber diameter." Id. In their papers they discussed methods of reducing the diameter fluctuations caused by the thermal air currents. One method that they found to work out the best is to feed the preform into the oven through a heated iris. The heating of the iris is designed to reduce the strength of the thermal currents by reducing the temperature differences between the preform and the surrounding air that drives these currents.

Heating of the iris, however, is often impractical to implement in high speed production systems since it requires tight temperature control of the iris and the oven. It also minimizes but does not eliminate the driving force behind these thermal currents oscillations.

Typically, when drawing plastic structures, the environment surrounding the preform is ignored. However, as demand for higher quality fibers increases, environmental effects on the diameter of drawn fibers should be addressed.

SUMMARY

A method of drawing a preform, in accordance with an embodiment, is disclosed. The method includes securing the preform to a mount and enclosing the preform in an enclosure. The enclosure can have an external surface and can define an orifice through which material drawn from the preform can exit the enclosure. Heat energy is supplied through the external surface to heat the preform to a temperature suitable for drawing the material. Material drawn from the preform is passed through the orifice.

A draw tower for drawing a preform, in accordance with another embodiment, is disclosed. The draw tower includes an enclosure configured to enclose a preform and an oven configured to heat the preform through the enclosure. A drawing apparatus draws material from the preform out of the enclosure to form a fiber.

A method of drawing a preform, in accordance with yet another embodiment, is disclosed. The method includes enclosing a preform in an enclosure, heating the preform through the enclosure with an oven, and drawing the preform.

BRIEF DESCRIPTION OF THE DRAWINGS

FIG. 1 is a side perspective view of a preform, in accordance with an embodiment;

FIG. 2 is a side view of a system for drawing a fiber from the preform of FIG. 1, in accordance with an embodiment;

FIG. 4 is a flow chart showing a method of drawing a preform, in accordance with an embodiment.

DETAILED DESCRIPTION

Figure 3:
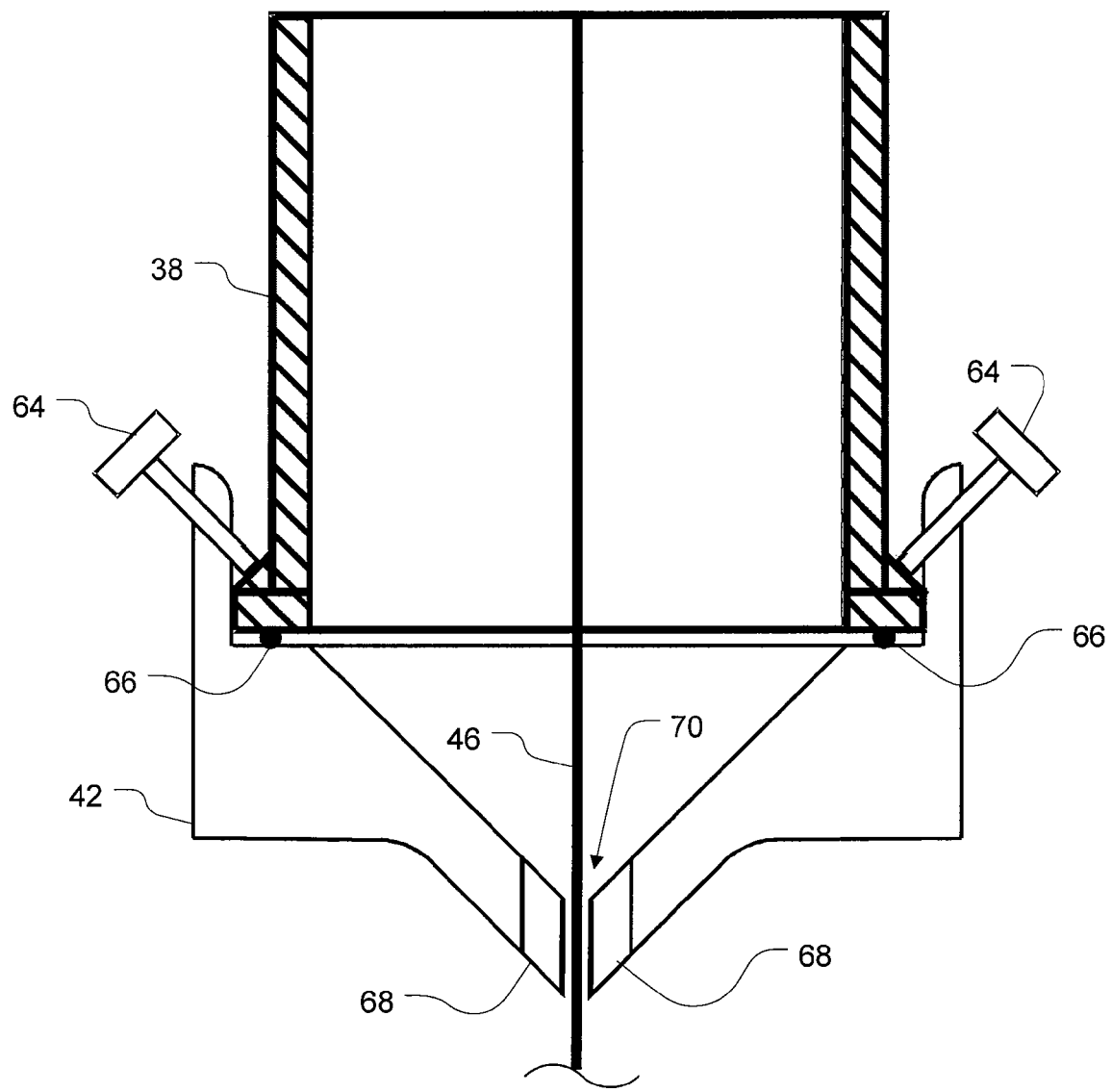
FIG. 3 is a side, cutaway view of an end cap of an enclosure used in the system of FIG. 2, in accordance with an embodiment.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

FIG. 1 shows a preform 20, in accordance with an embodiment. As used herein, a preform is a structure of one or more materials that can be formed, through a drawing process, into a fiber. While the present disclosure provides examples of preforms that can be drawn into optical fibers, it should be understood that a preform can be any structure of material that can be drawn using a drawing process. While preforms can be fabricated by extruding materials from a die, preforms should be distinguished from structures pushed through dies or structures that are pulled or drawn directly from dies. Typically, a preform is produced with two or more volumes of different materials that are arranged such that, when the preform is drawn, a fiber having desirable characteristics is produced. Examples are disclosed in U.S. patent application Ser. No. 11/080,202, filed Mar. 14, 2005. Preforms can also include only one volume of material, such as a polymer rod without cladding, that can be drawn into a fiber. Also, any fiber drawn from a preform can be coated after the drawing process with a coating that is in addition to or an alternative to a cladding. For instance, as is known, a fiber drawn from a polymer rod can be coated with a UV curable polymer or monomer.

For example, in the example shown in FIG. 1, the preform 20 includes a solid cylinder preform core 22 surrounded on its curved outer surface by a preform cladding 24. The preform cladding 24 and preform core 22 can be constructed from a variety of materials, including, but not limited to, polymer materials, such as thermal plastics. Non-limiting examples of suitable materials for the preform core 22 include cyclic olefin copolymers, polysulfone, Poly(methyl methacrylate) (PMMA), Polystyrene (PS), Zeonex, Zeonor, as well as fluoropolymers. Non-limiting examples of materials suitable for the preform cladding 24 include the above materials as well as Dyneon's THV materials such as THV 200, THV 500, THV 2030, polyurethanes or any other suitable polymer. Typically, for optical fibers, a preform core 22 is formed from an optically clear material having a higher index of refraction than the material used for the preform cladding, although other arrangements can be used. In this manner, when the preform 20 is drawn from an end of the preform 20, a fiber is formed having a fiber core (formed from the preform core 22) surrounded by a fiber cladding (formed from the preform cladding 24).

While the example in FIG. 1 shows a simple preform 20 having a single preform core 22 surrounded by a single preform cladding 24, it should be understood that preforms can have multiple cores and multiple claddings and that a core or cladding can have multiple layers. Further, preform cores and claddings need not have cylindrical shapes as shown, but can have various shapes in order to influence the geometry of pulled fibers. Additional or "sacrificial" claddings can be included to prevent distortion of a fiber's cross-sectional geometry during the drawing process.

FIG. 2 shows a side view of a fiber being drawn from the preform 20 using a draw tower 26, in accordance with an embodiment. The draw tower 26 includes a vertically-oriented translation slide 28 (also referred to as a translation stage) to which a mounting block 30 is movably attached such that the mounting block 30 can move in the vertical direction along the translation slide 28. In an embodiment, the mounting block 30 is moved by hand, although the mounting block 30 (and other components of the draw tower 26) can be moved using pneumatic cylinders, motors, and/or other mechanisms. In an embodiment, the translation slide 28 is mounted to a stable structure, such as a wall or column.

The mounting block 30, in an embodiment, includes a preform mount 32 on a lower side of the mounting block 30. The preform mount 32 is configured to hold and suspend a preform, such as the preform 20, at an upper end. The preform mount 32 can be movably attached to the mounting block 30 so as to allow horizontal and/or angular adjustment of a preform suspended by the preform mount 32. Generally, mounting blocks designed to adjust and maintain the alignment of attached preforms are known in the art. The mounting block 30 can also include other features, such as a side vacuum port 34 and a center vacuum port 36, both extending through the mounting block so as to reduce air pressure outside a preform mounted to the mounting block 30 and inside a preform (such as between a core and cladding of the preform) mounted to the mounting block 30, respectively. More vacuum ports can also be included so as to selectively apply a vacuum around or inside a preform and, in various embodiments, less than two vacuum ports are included. Further, one or more vacuum gauges, such as the vacuum gauge 37 can be included to monitor the pressure around the preform 20 or in other locations. Generally, the mounting block can include a variety of vacuum fittings for selective application of a vacuum and monitoring of applied vacuums with vacuum gauges.

In an embodiment, the mounting block 30 is configured to attach to an upper end of an enclosure 38 surrounding the preform 20, so that any vacuum applied by the vacuum ports 34, 36 are applied inside the enclosure 38. The enclosure 38 can be any structure completely or substantially surrounding the preform. In an embodiment, the enclosure 38 is a hollow cylindrical structure formed from a thermally conductive material, such as thermally stable glass, and having inner dimensions in horizontal directions slightly larger than corresponding outer dimensions of the preform 20. For example, if the preform has a cylindrical shape, such as the preform 20 shown in FIG. 1, the enclosure 38 can be a hollow cylinder having an inner diameter between 0.1 inches and 5 inches larger than the outer diameter of the preform, although the enclosure is not limited to that range. The enclosure 38, in an embodiment, is long enough to accommodate the preform 20 during drawing, that is, to accommodate the preform 20 including an elongated neck portion 40, caused by heating the preform 20 during the drawing process. For example, in an embodiment, the enclosure 38 is approximately seven feet long (or longer) for a five-foot long preform. The enclosure 38 can be closed at a lower end by an end cap 42, as described more fully below. As shown in the drawing, the elongated neck portion 40 of the preform 20 forms a pre-fiber 44 extending downwardly from the elongated neck portion 40 through the end cap 42.

As the pre-fiber 44 exits the end cap 42, it can be drawn into a fiber 46 as is known in the art. For example, as shown in FIG. 2, the draw tower 26 includes a wheel 48 around which the fiber 46 is guided through a laser diameter gauge 50 for monitoring the diameter of the fiber 46. From the laser diameter gauge 50, the fiber proceeds through a tension gauge 52 that is used to maintain a proper tension on the fiber 46. From the tension gauge 52, the fiber 46 proceeds through fiber stabilizer 54, around a second wheel 56, where it is collected on a take up wheel 58. The use of wheels, laser diameter gauges, tension gauges, fiber stabilizers, take up wheels, and other components in drawing fibers is known by those with ordinary skill in the art and, therefore, not discussed in detail. It should be noted that the draw tower 26 provides an example of a configuration that can be used in accordance with various embodiments, but that other configurations for drawing fibers are possible.

In accordance with an embodiment, the draw tower 26 includes an oven 60 supported by an oven mount 62 securely attached to a structure, such as the structure to which the translation stage 28 is attached. The oven 60 is configured to transmit heat energy through the enclosure from the oven 60 to the preform 20 to raise the preform 20 to a temperature suitable for drawing. As an example, the oven 60 can include one or more quartz T3 lamps oriented to direct heat toward the enclosure 38 so that the preform 20 is heated through the enclosure 38 by the lamp(s). In this manner, heat is also absorbed by the enclosure 38, which reduces the difference in temperature between the preform 20 and enclosure 38, thereby reducing the appearance of any residual chaotic thermal currents. Specific temperatures suitable for drawing the preform 20 depend on the material(s) from which the preform is composed and also depend upon the desired properties of the final fiber. Suitable temperatures for specific materials are known by those with ordinary skill in the art and, therefore, are not discussed in detail. For example, polymethyl methacrylate (PMMA) can be heated to between 175 C and 300 C and drawn.

It should be understood, however, that the enclosure need not be heated by the oven 60 and that other mechanisms for heating the preform can be used. For instance, in an embodiment, quartz T3 lamps having a blackbody radiation spectrum peak at around 1.3 microns or other heating elements are incorporated into an enclosure so that the oven 60 and enclosure 38 are a single unit. In this embodiment, the preform 20 can be moved relative to the oven/enclosure unit or the oven-enclosure unit can selectively apply heat in different locations. For example, the oven/enclosure unit can include a moveable plate having a slit or other opening so that the plate blocks heat energy except for heat energy allowed to pass through the slit or opening. Generally, any way of heating the preform 20 inside the enclosure 38 can be used.

FIG. 3 shows the end cap 42 in greater detail. As noted above, the end cap 42 is configured to attach to a lower end of the enclosure 38. In an embodiment, the end cap 42 is attached to the end cap by a plurality of holding screws 64 extending through the end cap 42 and into the enclosure 38. Other mechanisms, such as mechanisms applying vacuum pressure to maintain the end cap 42 attached to the enclosure 38 can be utilized instead of or in addition to the holding screws 64. An O-ring 66, sealant, or other device may provide a seal between the end cap 42 and the lower end of the enclosure 38.

In the example shown, the end cap 42 includes an insert 68, which provides an orifice 70 through which the fiber 46 can pass during drawing. In an embodiment, the orifice 70 has inner dimensions close to but slightly larger than outer dimensions of the fiber 46 being drawn so that air does not easily flow between the interior and exterior of the enclosure 38, such as when a vacuum is applied to the interior of the enclosure 38 using the side vacuum port 34. In an embodiment, the diameter of the orifice 70 should be sufficiently small and the length should be sufficiently long so that air flow through the orifice 70 is sufficiently restricted such that a vacuum or reduced pressure can be maintained inside the enclosure 38. In an embodiment, the orifice 70 is configured such that "choke flow" conditions on the flow of air through the orifice 70 is established. Choke flow (or "choked flow") conditions occur, for example, when pressure inside the enclosure has been decreased to a point beyond which a further decrease in pressure does not result in an increase in the speed at which air flows through the orifice. Generally, the dimensions of orifices capable of producing choke flow conditions vary greatly and are generally known and can be calculated either empirically or using known formulas.

Regardless of whether a vacuum is applied to the enclosure 38, the use of an enclosure reduces the effect of thermal currents resulting from the heating process on the diameter of the fiber. Generally, the use of an enclosure allows for a greater percentage of energy used to heat a preform to be in the form of radiated heat energy and a lesser percentage to be from convective currents. In this manner, the effect of convective currents on the diameter of drawn fibers is reduced.

By way of illustration consider the case of drawing a 200-micron-diameter optical fiber from a one-inch diameter, two-foot long preform using prior art methods, i.e. non-enclosed preform. The diameter fluctuations are usually between 7 and 10% using prior art methods. Enclosing the preform in a five-foot long glass tube enclosure with an inside diameter of 1.7 inches reduces the fluctuation of the diameter to less than 2%. Enclosing the preform inside the same glass tube and using an end cap with an orifice (2 cm long and with inside diameter of 1 mm) and applying a reduced pressure of 24 in-Hg inside the enclosure reduces diameter fluctuations to less than 0.5%.

As another non-limiting example, a system using a glass tube 7 feet long and four inches (ID) in diameter can be used. The system can be configured to accept interchangeable orifices that are ½ mm and ½ cm long, 1 mm diameter and 1 cm long, 2 mm in diameter and 2 cm long, and other orifices having different diameters and lengths. Higher vacuums in some cases can be used, as can differential vacuums in some cases, and combinations of vacuum and increased pressure in other cases.

One procedure that can be performed is to take a preform composed of a tube and a rod, and while drawing, applying a vacuum to the inside of the tube to ensure that the tube and rod seal as they are being drawn. With an enclosure around the preform a vacuum around the preform can be applied, and a higher vacuum inside of the tube (cladding material) can be applied so that the tube seals to the rod properly. This can be done using manual handvalves but it can also be done by installing electronic vacuum regulators.

In an embodiment, the insert 68 is a removable fitting that is configured, along with the end cap 42, such that the insert 68 can be attached to the end cap 42 by screwing the insert 68 into the end cap 42 or by otherwise attaching the insert 68 to the end cap 42. By making the insert 68 removable, different inserts having orifices of differing sizes and shapes can be used in order to draw different size fibers so that the passage of air between the interior and exterior of the enclosure 38 is minimized regardless of the size and shape of the fiber being drawn. It should be understood that, instead of providing inserts with different size orifices, other ways of providing different sized orifices can be used. For example, orifices can be built into end caps such that end caps can be interchanged to provide different sized orifices. In other embodiments, mechanisms for providing variable sized orifices, such as leaf or diaphragm shutters, can be used.

In an embodiment, as the fiber passes through the orifice, the fiber may touch the inside wall of the orifice as the fiber is drawn, although care can be taken to ensure that the fiber passes through the orifice without making contact. For example, a fiber drawn to a diameter of 50 microns using a 1-cm long orifice having a 1-mm diameter and a pressure inside the enclosure of 29 in-Hg may have variations in diameter of +/−0.3 microns when allowed to touch the orifice during drawing. The variations in diameter can be reduced by pulling the fiber to avoid touching the orifice.

FIG. 4 shows a diagram for drawing a preform, in accordance with an embodiment. At an enclosure step 72, the preform 20 is enclosed by the enclosure 38. In an embodiment, enclosing the preform 20 by the enclosure 38 includes placing the enclosure 38 without the end cap 42 around the preform 20. The enclosure step 72 can also include centering and orienting the preform 20 and enclosure 38 to each other, and centering and orienting the combination of preform 20 and enclosure 38 to the interior of the oven 60 such that the vertical sides of the preform 20, enclosure 38, and oven 60 are parallel to each other and remain parallel during the drawing process.

At a heating step 74, the preform is heated so that a bottom portion of the preform 20 drops (begins to draw) leaving a fiber connecting an upper portion of the preform 20 and the dropped lower portion of the preform 20 (commonly referred to as "the drop"). In an embodiment, the heating step 74 includes heating the preform 20 at a location above the lower end of the preform 20, for example, by positioning the oven 60 accordingly.

At a feeding step 76, in an embodiment, fiber from the preform 20 is fed through the end cap 42 and the end cap 42 is attached to the lower end of the enclosure 38. The fiber between the lower and upper portions of the preform 20 may be cut and the portion of the fiber connected to the upper portion of the preform 20 may be fed through the orifice 70 of the insert 68 of the end cap 42, or the lower end of the preform 20 can be fed through the end cap 42 in other ways. In another embodiment, the insert 68 is not inserted into the end cap 42 until the dropped lower end of the preform 20 has been fed through the orifice 70 of the insert. In this manner, the end cap 42 can be attached to the enclosure 38 before the lower end of the preform 20 is fed through the orifice 70.

Once the end cap 42 and insert 68 are in place with the fiber fed through the orifice 70, at a vacuum application step 78, a vacuum may be applied to the enclosure. As noted above, applying a vacuum to the enclosure can include reducing the pressure around the preform 20 and/or reducing the pressure between the core 22 of the preform 20 and the cladding 24 of the preform 20. In embodiments, a partial vacuum or reduction in pressure is applied evenly around the preform. In other embodiments, the vacuum application step 76 is omitted.

In whatever manner heating the preform 20 is accomplished, the preform 20 is drawn into a fiber at a drawing step 80. Drawing the heated preform 20 can be accomplished using methods known in the art, such as by using the apparatuses described above. In an embodiment, drawing the preform 20 includes heating the preform 20 with the oven 60 and moving the oven 60 relative to the preform 20 as the material of the preform 20 is depleted, so that the oven 60 is located in a suitable location during the drawing process, such as adjacent the lower end of the preform 20 from which material is drawn. As shown in the drawings, the oven 60 is stationary while the preform 20 is movable relative to the oven 60 since the preform 20 is attached to the mounting block 30, which is movable vertically about the translation slide 28. Thus, in the embodiment shown in the drawings, moving the oven 60 relative to the preform 20 is accomplished by moving the preform 20 relative to the stationary oven 60. In other embodiments, relative motion between the preform and the oven can be accomplished in other ways. For instance, in alternate embodiments, the oven 60 is movably attached to a structure such that the oven 60 can be moved in a vertical direction. With the oven 60 movable, the mounting block can be fixedly attached to the translation slide 28 or other structure. In other alternative embodiments, both the preform 20 and the oven 60 are moveable in the vertical direction so that relative motion between the oven 60 and the preform 20 can be accomplished by moving both the preform 20 and the oven 60. In yet other embodiments, heating the preform 20 does not involve moving the preform 20 or the oven 60. Instead, the oven 60 is configured with a plurality of selectively operable heating elements such that, as the preform 20 is drawn, only those heating elements in a suitable position are operated at a time. Also, a combination of the above ways of heating the preform 20 can be used.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of drawing a preform, comprising:
   securing the preform to a mount;
   substantially encasing the preform in an enclosure, the enclosure having an external surface and defining an orifice through which material drawn from the preform can exit the enclosure;
   heating the encased preform through the external surface to a temperature suitable for drawing the material from the preform;
   reducing pressure inside the enclosure; and
   drawing the material from the heated encased preform through the orifice during at least a time period when the pressure inside the enclosure is reduced.

2. The method of claim 1, further comprising providing relative motion between the oven and the preform to compensate for depletion of the preform as the preform is drawn.

3. The method of claim 2, wherein providing relative motion between the oven and the preform includes moving the enclosure and the preform in concert relative to the oven, the oven being stationary.

4. The method of claim 2, wherein providing relative motion between the oven and the preform includes moving the oven relative to the enclosure and preform, the enclosure and preform being stationary.

5. The method of claim 1, wherein the orifice has inner dimensions approximately equal to, but greater than outer dimensions of the material drawn from the preform as the material passes through the orifice.

6. The method of claim 1, wherein the orifice is configured to create choke flow conditions for the passage of air through the orifice.

7. The method of claim 1, wherein heating the preform through the external surface includes transmitting heat energy through the enclosure to the preform.

8. A method of drawing material, comprising:
   substantially encasing a preform in an enclosure;
   heating the encased preform with a heating device;
   using a vacuum device to reduce pressure inside the enclosure, the vacuum device being fluidly connected to the enclosure; and
   drawing the heated encased preform during at least a time period when the pressure inside the enclosure is reduced.

9. The method of claim 8, further comprising moving the oven relative to the preform.

10. The method of claim 9, wherein the oven is stationary and wherein moving the oven relative to the preform includes moving the preform.

11. The method of claim 8, wherein drawing the preform includes pulling material from the preform through an orifice located at a lower end of the enclosure, the orifice having inner dimensions approximately equal to, but larger than outer dimensions of the material as it passes through the orifice.

12. The method of claim 11, wherein the enclosure includes a lower end and wherein the orifice is defined by an insert removably attached to an end cap capping the lower end.

13. The method of claim 12, wherein the insert is selected from a plurality of pre-manufactured inserts.

14. The method of claim 8, wherein drawing the preform includes pulling a portion of a pre-fiber from within the enclosure, the pre-fiber being material from the preform extending downwardly from the preform.

15. A method of drawing material, comprising:
enclosing at least a portion of a preform in an enclosure, said at least a portion of the preform having an external surface and the enclosure having an internal surface;
reducing pressure between the external surface and the internal surface;
heating said at least a portion of the enclosed preform with a heating device; and
drawing the heated enclosed preform during at least a time period when the pressure between the external surface and the internal surface is reduced.

16. The method of claim 15, wherein said heating includes transferring, by an oven, heat energy to the preform and wherein the method includes moving the oven relative to the preform.

17. The method of claim 15, wherein said enclosing includes substantially encasing the preform in the enclosure.

18. The method of claim 15, wherein drawing the preform includes pulling material from the preform through an orifice located at a lower end of the enclosure, the orifice having inner dimensions approximately equal to, but larger than outer dimensions of the material as it passes through the orifice.

19. The method of claim 15, wherein the enclosure includes a lower end and wherein the orifice is defined by an insert removably attached to an end cap capping the lower end.

20. The method of claim 19, further comprising selecting the insert from a plurality of pre-manufactured inserts.

21. The method of claim 15, wherein said heating includes transmitting heat energy through the enclosure to the preform.

22. The method of claim 15, wherein drawing the preform includes pulling a portion of a pre-fiber from within the enclosure, the pre-fiber being material from the preform extending downwardly from the preform.

23. The method of claim 15, wherein said enclosing said at least a portion of the preform includes encasing said at least a portion of the preform.

24. The method of claim 23, wherein said encasing said at least a portion of the preform includes encasing the entire preform.

* * * * *